Dec. 19, 1961  C. E. LYALL ET AL  3,013,581
FLUID CONTROL VALVE
Filed July 7, 1958

INVENTORS
Charles E. Lyall
Robert J. Holding
By H. T. Johnston
ATTORNEY

United States Patent Office 3,013,581
Patented Dec. 19, 1961

3,013,581
FLUID CONTROL VALVE
Charles E. Lyall, Northbrook, and Robert J. Holding, Chicago, Ill., assignors, by mesne assignments, to The Horton Company, Pittsburgh, Pa., a corporation of Pennsylvania
Filed July 7, 1958, Ser. No. 746,743
4 Claims. (Cl. 137—625.4)

Our invention is an improved variable automatic mixing valve primarily intended for automatic washing machines for home use.

Two types of mixing valves employed in automatic washers now on the market are commonly referred to as the thermostatic valve and the non-thermostatic valve. From the standpoint of simplicity and cost, the non-thermostatic type is preferable, but valves of this type can supply to the machine only water which is all hot, water which is all cold, or an unvariable mixture of the two. The temperature of the mixture will depend on the temperatures and relative pressures at the hot and cold supply connections, and these may vary from house to house or from time to time in the same house. Thus, the results produced by the non-thermostatic valve are not always satisfactory.

The thermostatic mixing valves overcome to some extent the disadvantages of the non-thermostatic valves because the thermostat, within limits, will compensate for variations in temperatures and pressures at the hot and cold water connections, and deliver water at some fairly uniform temperature depending on the pre-setting of the thermostat. In most such valves now in use, the only other temperature obtainable is that of the hot supply itself. Thus, in one position of a control knob, pure hot water may be obtained for washing and under the control of a timer, the mixture, as determined by the thermostat, will be supplied for the rinsing cycle. In the other position of the control knob, the same mixture controlled by the thermostat is supplied for both the washing and rinsing cycles.

Important disadvantages of the thermostatic mix-valves are the higher initial cost of manufacture, and the unreliability in the performance over a long period of time. Furthermore, while it has been proposed to make such thermostats adjustable, so that the user could vary the temperature of the mixed water to suit different conditions and needs, this has generally not been done in practice because of the still further complications and expense.

In general, the purpose of our invention is to provide an improved automatic mixing valve which will, in effect, combine the advantages of present valves of both the non-thermostatic type and the thermostatic type, and further to enable the user quickly and easily to obtain unlimited variations of the temperature of the water being delivered, over the entire range between the temperatures of the hot and cold water supplies.

Our improved mixing valve involves the use of a metering valve fitted into the valve body and means for automatically shifting the valve from one limiting position to another under the control of the timer. One position will determine the desired mixture for the wash water and the other position will determine the desired mixture for the rinse water. These positions may be independently varied by a simple manual adjustment to any one of the infinite number of positions for either the wash water or rinse water. With this arrangement, only a single solenoid valve is required, controlling the flow from the metering chamber to the outlet.

Thus in practice, the user will decide the temperature of the wash water and also the temperature of the rinse water most suitable for the fabrics being laundered and set the stop control knobs in a position to obtain those temperatures and the exact positions will vary depending on the temperatures and relative pressures of the hot and cold supply in any particular installation. A temperature indicating device may be conveniently arranged to show the temperature of the water in the outlet so that these adjustments can produce precisely the temperatures desired. Thereafter, the flow of water for the washing cycle and for the rinse cycle is automatically controlled by the timer and the solenoid valve.

Another object is to provide a mixing valve of the above character in a compact package which is economical to manufacture and which can be easily installed in the available space in a washing machine. Other objects and advantages of the invention will hereinafter more fully appear.

In the accompanying drawings, we have shown for purpose of illustration, one embodiment which our invention may assume in practice.

Figure 1:
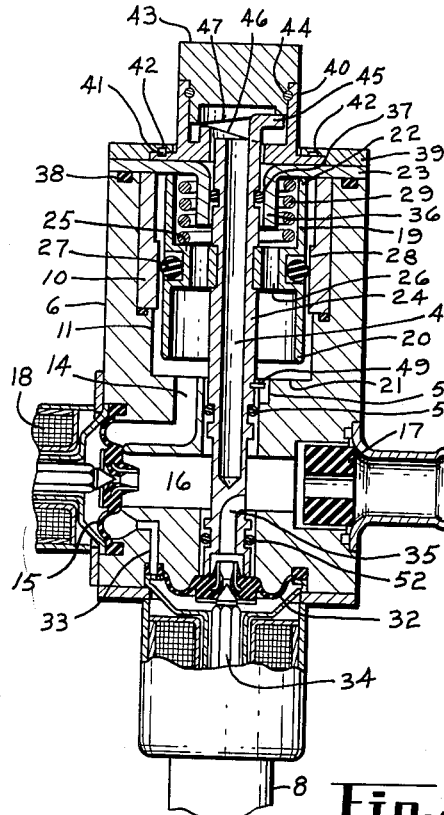
FIG. 1 is a central vertical section through our improved variable mixing valve.

The valve body is molded from any suitable material, such as nylon which is now in general use for washing machine mixing valves. The body is provided with separate connections 7 and 8 for the hot and cold water respectively and these are preferably threaded to receive the usual hose connections. The outlet connection in the form of a metal nipple 9 is attached to the valve body in any suitable manner.

At the upper end of the valve body 6 is a large cavity into which preferably is fitted a metal insert 10 providing a cylindrical metering chamber 11, and a passage 12 leads from the cold water inlet connection 8 to the upper end of this metering chamber while a passage 13 leads from the hot water connection 7 to the lower end of the metering chamber.

An outlet passage 14 leads from the bottom of the metering chamber 11 to a diaphragm valve 15. When the diaphragm valve 15 is open, water flows from the metering chamber 11 through the passage 14 into a transverse passage 16 and flow restrictor 17 to the outlet nipple 9. The diaphragm valve 15 may be of a type commonly used in washing machine valves and since the construction and operation of such valves are well-known, it will not be described in detail except to say that it is controlled by a solenoid 18 which may be connected to the timer. Also, the flow restrictor 17 may be of any well-known type and is herein shown as a rubber annulus having a central port.

The metering valve herein shown is in the form of a hollow cylinder 19 whose lower edge 20 may seat against the bottom wall 21 of the metering chamber 11 to effect closing of the hot water flow and whose upper edge 22 is adapted to seat against the inner flat surface of a wide flanged bushing 23 to close off the flow of cold water to the interior of the cylinder 19. At any intermediate position of the cylinder valve 19, both hot and cold water may flow, and the proportion of hot and cold water, and thus the temperature of the mixture will depend upon the position of the valve between its two extreme positions. In the position shown in the drawing, the valve 19 is seated against the flange of bushing 23 so that only hot water is permitted to flow under the lower edge 20 of the valve to the passage 14. It will be noted that the passages 12 and 13 enter the metering chamber 11 at points located to the outside of the cylindrical valve 19 while the outlet passage 14 leads from the chamber through the bottom end wall 21 thereof at a point in line with the hollow space within the cylindrical valve.

For shifting the valve 19 endwise from one position to another, a valve operating stem 24 is tightly fastened in any suitable manner to an internal spider 25 of the cylindrical valve 19. The spider has passages 26 so that water may flow freely through the interior of the valve, and at this point, it may be also noted that the upper and lower ends of the metering chamber 11 are sealed from one another by a rubber O ring 27 mounted in a groove around the mid-part of the cylindrical valve 19 and fitting against a cylindrical surface 28 of the metal insert 10.

Figure 2:
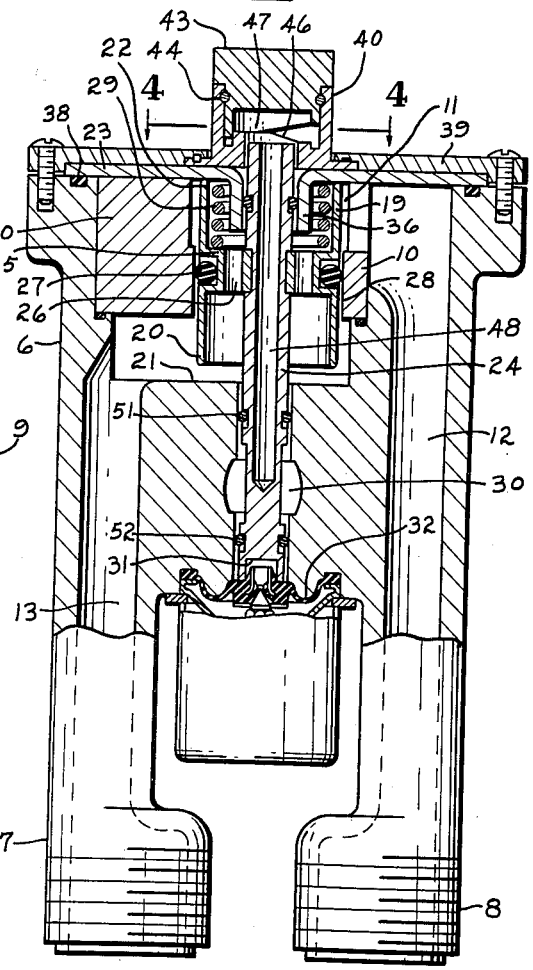
FIG. 2 is also a central vertical section at right angles to that of FIG. 1.
Figure 3:
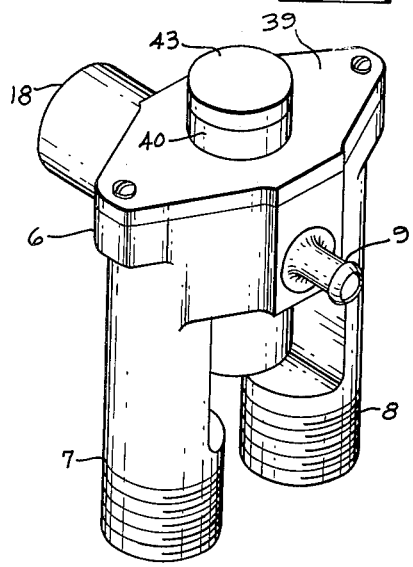
FIG. 3 is a perspective view of the mixing valve.
Figure 4:
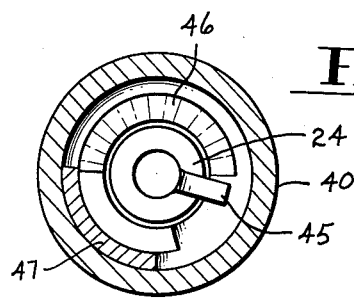
FIG. 4 is a cross-section on line 4—4 of FIG. 2.

The valve 19 and its operating stem 24 are normally urged downwardly by a compression spring 29 acting between the flange 23 and the spider 25. The stem 24 extends downwardly through the central part of the valve body 6 and across the outlet passage 16 which may be somewhat widened at this point as indicated at 30 in FIG. 2. The bottom end of the stem 24 is recessed as indicated at 31 and bears against a suitable fluid-pressure operated device herein in the form of a diaphragm 32. The bottom side of this diaphragm is subjected to hydraulic pressure because it communicates through a restricted angular passage 33 with the chamber surrounding the diaphragm valve 15, and this hydraulic pressure is normally sufficient to overcome force exerted by the spring 29 so that when the diaphragm 32 is subjected to this pressure, the metering valve 19 will be held in its upper position which may be designated as the wash water position.

A solenoid valve 34 is connected to the timer and energized when the time cycle calls for rinse water. When so energized, the space below the diaphragm 32 opens to a short passage 35 formed in the valve operating stem 24 and directed to the outlet passage 16. Since the passage 33 supplying water to the bottom side of the diaphragm 32 is more restricted than the passage 35, the pressure acting on said diaphragm will be relieved so that the spring 29 forces the metering valve 19 to its bottom position which may be designated as the rinse water position.

The valve operating stem 24 extends upwardly through the valve body and is supported by the hub 36 of the flanged bushing 23. A water seal in the form of an O ring 37 is placed between the hub 36 and stem 24, and a gasket 38 provides a seal between the flange 23 and the valve body 6. A cover plate 39 is attached to the valve body by suitable screws to hold the flanged bushing in place, and mounted in an undercut recess in this plate is an inner operating knob 40. The knob 40 is free to turn within predetermined limits and for this purpose, it may carry a pin 41 operating in a groove 42 in the cover plate 39.

Mounted to turn in the inner knob 40 is an outer operating knob 43 which can turn freely in the inner knob and being held in place by suitable means such as a split ring 44. At its upper end, the stem 24 carries an outwardly extending lug 45 so as to be in operative engagement with the inner cam surface 46 on the inner operating knob which engages the underside of the lug 45, and an inclined cam surface 47 on the outer operating knob is adapted to engage the upper side of the lug 45. These cam surfaces on the operating knobs 40 and 43 serve as stops to limit the upward and downward movement of the operating stem 24 and cylindrical valve 19. In the position shown in FIG. 1, the valve 19 is being held by hydraulic pressure acting on the diaphragm 32 and the outer operating knob 43 is set so that the valve is completely seated against the flanged bushing 23. It will be evident that when the outer knob 43 is turned so that a different portion of the inclined cam surface 47 registers with the lug 45, such upward movement will be limited to an intermediate position where cold water may flow through the hollow interior of the valve to mix with hot water at the bottom end of the valve. The more the knob 43 is turned away from the position shown in FIG. 1, the greater will be the portion of cold water and the lesser will be the proportion of hot water. Thus, by adjusting the knob 43 any one of an infinite number of variations may be obtained for the temperature of the water for the washing cycle.

In like manner, it will be understood that adjustment of the inner knob 40 will permit of an infinite number of variations for the rinse water. Assuming that the timer has called for rinse water, the solenoid valve 34 will open and allow the spring 29 to push the valve 19 down until the lug 45 hits the cam 46. With the parts in the position as shown in FIG. 1, the valve will move all the way down and close off completely the hot water allowing only cold water for the rinse cycle, but as the inner knob 40 is turned away from the position shown, a higher portion of the cam 46 will register with the lug 45 and thus provide an adjustment to an infinite number of positions so that the rinse water may be tempered exactly as desired. After the knobs have been adjusted to suit any given set of conditions, the valve will operate automatically in shifting from the washing cycle to the rinsing cycle. It will be evident that suitable dial indicators may be arranged in association with the knobs 40 and 43 and also, the axial bore 48 which extends to the region of the outlet passage 16 provides an ideal place for a bi-metallic element to be placed and extended axially through the knobs to indicate with a suitable dial the temperature of the mixed water.

The operating stem 24 is prevented from turning by suitable means such as a pin 49 fixed to said stem and extending into a groove 50 in the valve body. Suitable seals around the stem on each side of the outlet 16 are provided in the form of O rings 51 and 52.

As a result of our invention, it will now be evident that we have provided a mixing valve in the form of a compact package wherein the user may obtain an infinite variation in the temperature of not only the wash water but also the rinse water. The rinse water can never be of a higher temperature than the wash water. This is accomplished by a relative simple metering valve which is operated automatically by hydraulic pressure and, therefore, the valve operation is reliable.

Automatic operation of the valve between wash and rinse temperature is obtained by the use of a single solenoid valve on the outlet side rather than separate solenoid valves on the inlets.

We claim:

1. In a variable mixing valve, separate inlets for hot and cold water, an outlet, a metering chamber communicating with said inlets and outlet, a metering valve in said chamber movable from a forward limiting position where the metering valve determines one proportion of hot and cold water flowing to the outlet and to a back limiting position where the metering valve determines a different proportion of hot and cold water flowing to the outlet, electrically controlled means for automatically shifting said metering valve from one to the other of said limiting positions, and means for independently varying each of said limiting positions; said last-mentioned means comprising operating means having front and back spaced-apart cam surfaces, and a projecting portion carried by said metering valve and cooperatively engaging between said cam surfaces to control forward and back limits of movement of said metering valve.

2. In a variable mixing valve, a valve body provided with separate inlet connections for hot and cold water and an outlet connection, a metering chamber in said valve body, separate passages formed in the valve body leading from said hot and cold water inlet connections to different portions of said chamber, an outlet passage leading from said chamber to said outlet connection, a metering valve movable forwardly and backwardly in said chamber to in one direction, increase the flow of hot water and decrease the flow of cold water into said outlet passage and to in the opposite direction, decrease the flow of hot water while increasing the flow of cold water, manually adjustable stop means to select the limiting position of said metering valve when moved in one direction to determine one desired proportion of hot and cold water, independently adjustable stop means to select the limiting positions of said metering valve when moved in the opposite direction to determine a second desired proportion of hot and cold water, and electrically controlled means for automatically shifting said valve from one of said limiting positions to the other as determined by said stop means; said manual adjustable stop means having a cam surface, said independently adjustable stop means having a cam surface in a forwardly spaced-apart relation with the cam surface of said manually adjustable stop means, and said metering valve having a projecting portion carried thereby and cooperatively positioned between said cam surfaces to control limits of backward and forward movement of said metering valve.

3. In a variable mixing valve, a valve body provided with separate inlet connections for hot and cold water at one end of the valve body, a metering chamber at the other end of the valve body and an outlet passage at the side of the valve body, a metering valve movable backwardly and forwardly in said chamber to vary the proportion of hot and cold water, a valve operating stem extending endwise through the valve body, spring means normally urging said stem and valve in one direction, hydraulic means for moving the valve against the force of said spring means in the opposite direction, electrical means for controlling said hydraulic means, passages in the valve body leading from said inlet connections to different parts of said metering chamber, an outlet passage leading from said chamber by way of a solenoid controlled valve to the outlet connection, and manually adjustable stop means cooperating with that portion of said valve operating stem which extends outside the valve body to limit the movement of said valve in either direction whereby said metering valve may be automatically shifted between two variable positions to provide one and another of two selective proportions of hot or cold water; said manually adjustable stop means having a pair of cam surfaces provided in a front and back spaced-apart relation with each other, and the portion of said valve operating stem which extends outside the valve body having lug means operatively positioned between said cam surfaces to cooperate therewith in controlling backward and forward limits of movement of said metering valve.

4. In a variable mixing valve, the combination defined in claim 3 wherein, said metering chamber is of generally cylindrical shape and said valve is a hollow cylinder having open end portions connected by a through passageway and mounted for limited longitudinal backward and forward movement in the chamber, the ends of said valve cooperate with the end walls of the chamber for controlling the flow of hot and cold water across the ends of the valve toward its hollow interior, said inlet passages communicate with opposite ends of said metering chamber at points located to the outside of the cylindrical valve, and said outlet passage communicates with said metering chamber through an end wall thereof at a point located inwardly of the wall of said hollow valve.

References Cited in the file of this patent

UNITED STATES PATENTS

| | | |
|---|---|---|
| 1,943,865 | Hennessey | Jan. 16, 1934 |
| 2,129,499 | Landon | Sept. 6, 1938 |
| 2,507,954 | Binnall | May 16, 1950 |
| 2,620,134 | Obermaier | Dec. 2, 1952 |
| 2,830,765 | Beller | Apr. 15, 1958 |